US012720293B2

(12) United States Patent
Kim et al.

(10) Patent No.: US 12,720,293 B2
(45) Date of Patent: Aug. 25, 2026

(54) METHOD AND APPARATUS TO PROVIDE USER PLANE PATH MANAGEMENT INFORMATION OF EDGE TRAFFIC FOR HOME-ROUTED USER EQUIPMENT IN MOBILE NETWORK SYSTEM

(71) Applicant: Samsung Electronics Co., Ltd., Suwon-si (KR)

(72) Inventors: Hyesung Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 18/402,116

(22) Filed: Jan. 2, 2024

(65) Prior Publication Data

US 2024/0236636 A1 Jul. 11, 2024

(30) Foreign Application Priority Data

Jan. 5, 2023 (KR) ........................ 10-2023-0001958

(51) Int. Cl.
*H04W 8/06* (2009.01)
*H04W 76/20* (2018.01)

(52) U.S. Cl.
CPC ............. *H04W 8/06* (2013.01); *H04W 76/20* (2018.02)

(58) Field of Classification Search
CPC ................................ H04W 8/06; H04W 76/20
USPC .......................................................... 455/433
See application file for complete search history.

(56) References Cited

U.S. PATENT DOCUMENTS

2018/0352050 A1* 12/2018 Li ........................ H04L 67/5682
2021/0274392 A1 9/2021 Dao et al.

OTHER PUBLICATIONS

China Mobile; Solution update for Sol#1; SA WG2 Meeting #SA2-152E; S2-2207741; Aug. 17-26, 2022; Electronic meeting; Aug. 29, 2022.

3GPP; 3rd Generation Partnership Project; Technical Specification Group Core Network and Terminals; Enabling Edge Applications; Application Programming Interface (API) specification; Stage 3; (Release 18); 3GPP TS 29.558; V18.0.0; (Dec. 2022); Valbonne, France; Dec. 16, 2022.

3GPP; 3rd Generation Partnership Project; Technical Specification Group Services and System Aspects; 5G System Enhancements for Edge Computing; Phase 2 (Release 18); 3GPP TR 23.700-48; V18.0.0; (Dec. 2022); Valbonne, France; Dec. 21, 2022.

(Continued)

*Primary Examiner* — Joel Ajayi
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A method by a first entity for performing a visited session management function (V-SMF) in a wireless communication system is provided. The method includes transmitting, by the first entity to a second entity performing a visited-network exposure function (V-NEF), an application function (AF) notification subscribe request, receiving, by the first entity from the second entity, a response message of the AF notification subscribe request, and receiving, by the first entity from the second entity, application data for AF traffic influence request information.

20 Claims, 5 Drawing Sheets

(56) References Cited

OTHER PUBLICATIONS

Ericsson; Ki #1, Sol #25: Solution update; 3GPP TSG-WG SA2 Meeting #152E e-meeting; S2-2207739; E-meeting; Aug. 17-26, 2022; Aug. 28, 2022.
International Search Report with Written Opinion dated Apr. 11, 2024; International Appln. No. PCT/KR2024/000041.
3GPP; 3rd Generation Partnership Project; Technical Specification Group Core Network and Terminals; 5G System; Policy and Charging Control signalling flows and QoS parameter mapping; Stage 3 (Release 18); 3GPP TS 29.513; V18.6.0; (Jun. 2024); Valbonne, France; XP052642955; Jun. 24, 2024.
3GPP; 3rd Generation Partnership Project; Technical Specification Group Core Network and Terminals; Study on CT WG3 Aspects of 5G System Phase 1; (Release 16); 3GPP TR 29.890; V16.0.0; (Jul. 2020); Valbonne, France; XP051924753; Jul. 10, 2020.
Extended European Search Report dated Mar. 12, 2026; European Appln. No. 24738670.9—1218 / 4620186 PCT/KR2024000041.

* cited by examiner

FIG. 1

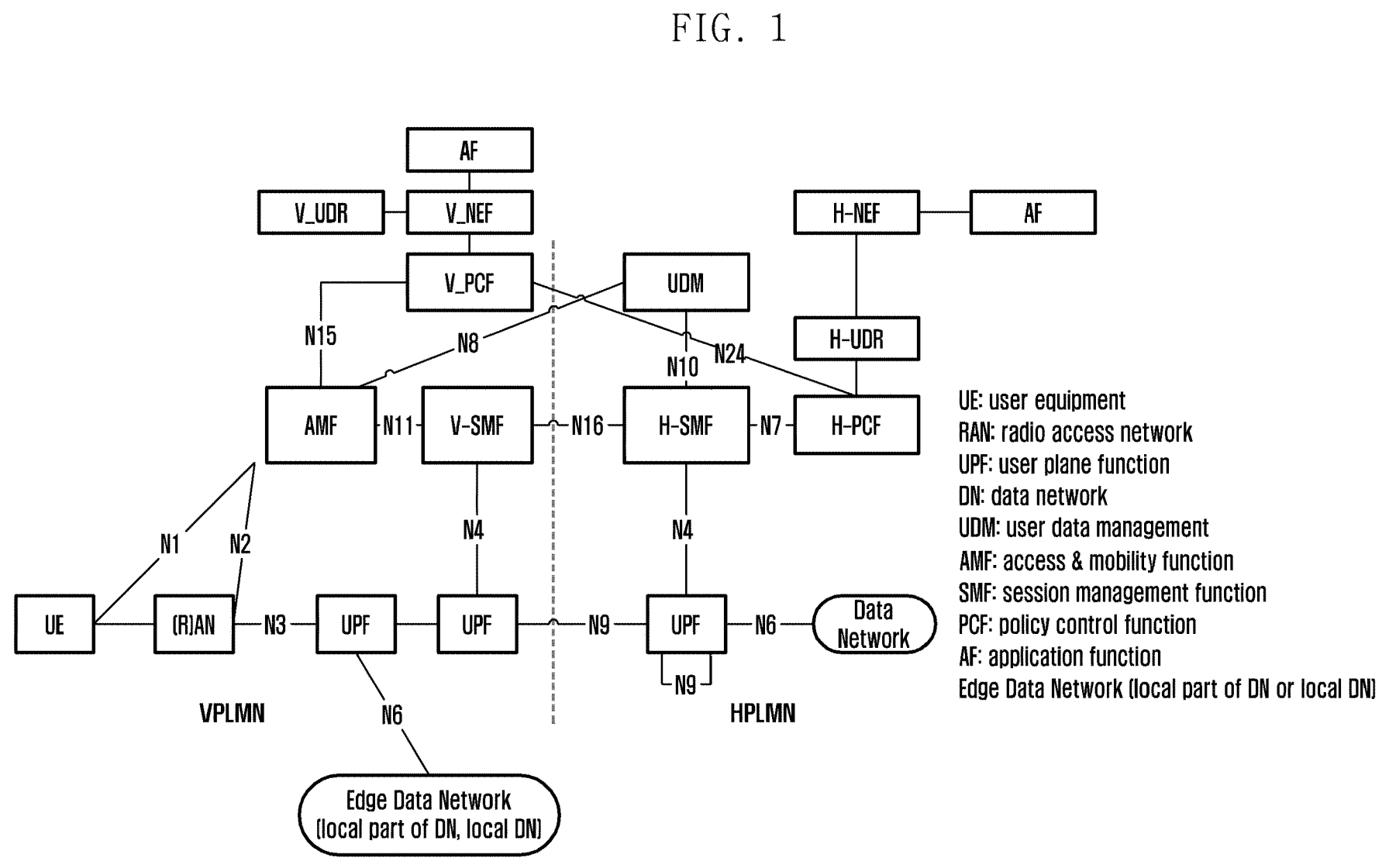

UE: user equipment
RAN: radio access network
UPF: user plane function
DN: data network
UDM: user data management
AMF: access & mobility function
SMF: session management function
PCF: policy control function
AF: application function
Edge Data Network (local part of DN or local DN)

METHOD AND APPARATUS TO PROVIDE USER PLANE PATH MANAGEMENT INFORMATION OF EDGE TRAFFIC FOR HOME-ROUTED USER EQUIPMENT IN MOBILE NETWORK SYSTEM

CROSS-REFERENCE TO RELATED APPLICATION(S)

This application is based on and claims priority under 35 U.S.C. § 119(a) of a Korean patent application number 10-2023-0001958, filed on Jan. 5, 2023, in the Korean Intellectual Property Office, the disclosure of which is incorporated by reference herein in its entirety.

BACKGROUND

1. Field

This disclosure relates to a wireless communication system. More particularly, the disclosure relates to a method and apparatus for supporting provision of traffic path management information when providing an edge computing service to a home-routed roaming user equipment (UE) in a communication system.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi-input multi-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, Layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

With recent developments in communication systems, various studies have been conducted on how to provide relevant traffic path management information to an external system of the core network when providing edge computing services to home-routed roaming UEs.

The above information is presented as background information only to assist with an understanding of the disclosure. No determination has been made, and no assertion is made, as to whether any of the above might be applicable as prior art with regard to the disclosure.

SUMMARY

For a roaming UE to use an edge computing service through a home-routed (HR) session, the session must be branched to a local data network (or a local access part of the data network) where the edge computing server of a visited network is installed.

Through branched sessions, changes in a user plane function (UPF) on the user plane path or changes in a data network access identifier between the edge computing server and the UE may occur depending on the mobility of the UE. Information on these changes must be provided to the edge computing server to perform relocation of the edge application or relocation of the edge application context in response to the mobility of the UE.

In order to provide the information, a subscription request must be made to a visited network session management function (V-SMF) through a policy control function (PCF). However, because the PCF of the visited public land mobile network (VPLMN) does not intervene in the session management service for HR roaming UEs, the subscription request for the provision of relevant information must be made through the PCF of the home public land mobile network (HPLMN) or through a path that does not go through the V-PCF within the VPLMN.

Aspects of the disclosure are to address at least the above-mentioned problems and/or disadvantages and to provide at least the advantages described below. Accordingly, an aspect of the disclosure is to provide a method for providing relevant traffic path management information to a system outside the core network when providing an edge computing service to a home-routed roaming UE.

Additional aspects will be set forth in part in the description which follows and, in part, will be apparent from the description, or may be learned by practice of the presented embodiments.

In accordance with an aspect of the disclosure, a method by a visited network session management function (visited SMF, V-SMF) entity for performing a session management function (SMF) in a wireless communication system is provided. The method includes transmitting a user plane path management event notification (UPPM) event notification service subscription request to a visited user data repository (V-UDR) entity performing one or more user data repository (UDR) functions or a visited network exposure function (V-NEF) entity performing a network exposure function (NEF), receiving a response message including the UPPM event notification service subscription request from at least one of the V-UDR or V-NEF, and monitoring UPPM event occurrence based on the UPPM event notification service subscription information is proposed.

In accordance with another aspect of the disclosure, a method by a home network session management function (home SMF, H-SMF) entity for performing a session management function (SMF) in a wireless communication system is provided. The method includes receiving user plane path management event notification (UPPM) event notification service subscription information from a home network policy management function network entity (home policy control function (PCF), H-PCF) performing a policy control function (PCF), determining whether the UPPM event notification service subscription information should be transmitted to the visited network session management function network (visited SMF, V-SMF) entity performing the session management function (SMF), and transmitting the UPPM event notification service subscription information to the V-SMF when it is determined that the UPPM event notification service subscription information should be transmitted to the V-SMF is proposed.

In accordance with another aspect of the disclosure, a visited network session management function (visited network SMF, V-SMF) entity for performing a session management function (SMF) in a wireless communication system is provided. The visited network SMF entity includes a transceiver transmitting and receiving signals, memory, and one or more processors communicatively coupled to the transceiver and the memory, wherein the memory store one or more computer programs including computer-executable instructions that, when executed by the one or more processors, cause the visited network SMF entity to transmit a user plane path management event notification (UPPM) event notification service subscription request to a visited user data repository (V-UDR) entity performing one or more user data repository (UDR) functions or a visited network exposure function (V-NEF) entity performing a network exposure function (NEF), receive a response message including the UPPM event notification service subscription request from at least one of the V-UDR or V-NEF, and monitor UPPM event occurrence based on the UPPM event notification service subscription information.

In accordance with another aspect of the disclosure, a home network session management function (home SMF, H-SMF) entity for performing a session management function (SMF) in a wireless communication system is provided. The home network SMF entity includes a transceiver transmitting and receiving signals, memory, and one or more processors communicatively coupled to the transceiver and the memory, wherein the memory store one or more computer programs including computer-executable instructions that, when executed by the one or more processors, cause the home network SMF entity to receive user plane path management event notification (UPPM) event notification service subscription information from a home network policy management function network entity (home PCF, H-PCF) performing a policy control function (PCF), determine whether the UPPM event notification service subscription information should be transmitted to the visited network session management function network (visited SMF, V-SMF) entity performing the session management function (SMF), and transmit the UPPM event notification service subscription information to the V-SMF when it is determined that the UPPM event notification service subscription information should be transmitted to the V-SMF.

In accordance with another aspect of the disclosure, one or more non-transitory computer-readable storage media storing one or more computer programs including computer-executable instructions that, when executed by one or more processors, cause a first entity performing a visited session management function (V-SMF) in a wireless communication system to perform operations are provided. The operations include transmitting, to a second entity performing a visited—network exposure function (V-NEF), an application function (AF) notification subscribe request, receiving, from the second entity, a response message of the AF notification subscribe request, and receiving, from the second entity, application data for AF traffic influence request information.

According to an embodiment of the disclosure, when a home-routed roaming UE receives an edge computing service, information on changes in the user plane path of the edge computing service traffic according to the mobility of the UE may be provided outside the core network. Through the information, the sustainability of the edge computing service may be guaranteed.

Other aspects, advantages, and salient features of the disclosure will become apparent to those skilled in the art from the following detailed description, which, taken in conjunction with the annexed drawings discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a diagram illustrating a 5G system structure supporting home-routed (HR) roaming according to an embodiment of the disclosure;

The same reference numerals are used to represent the same elements throughout the drawings.

DETAILED DESCRIPTION

Figure 2:
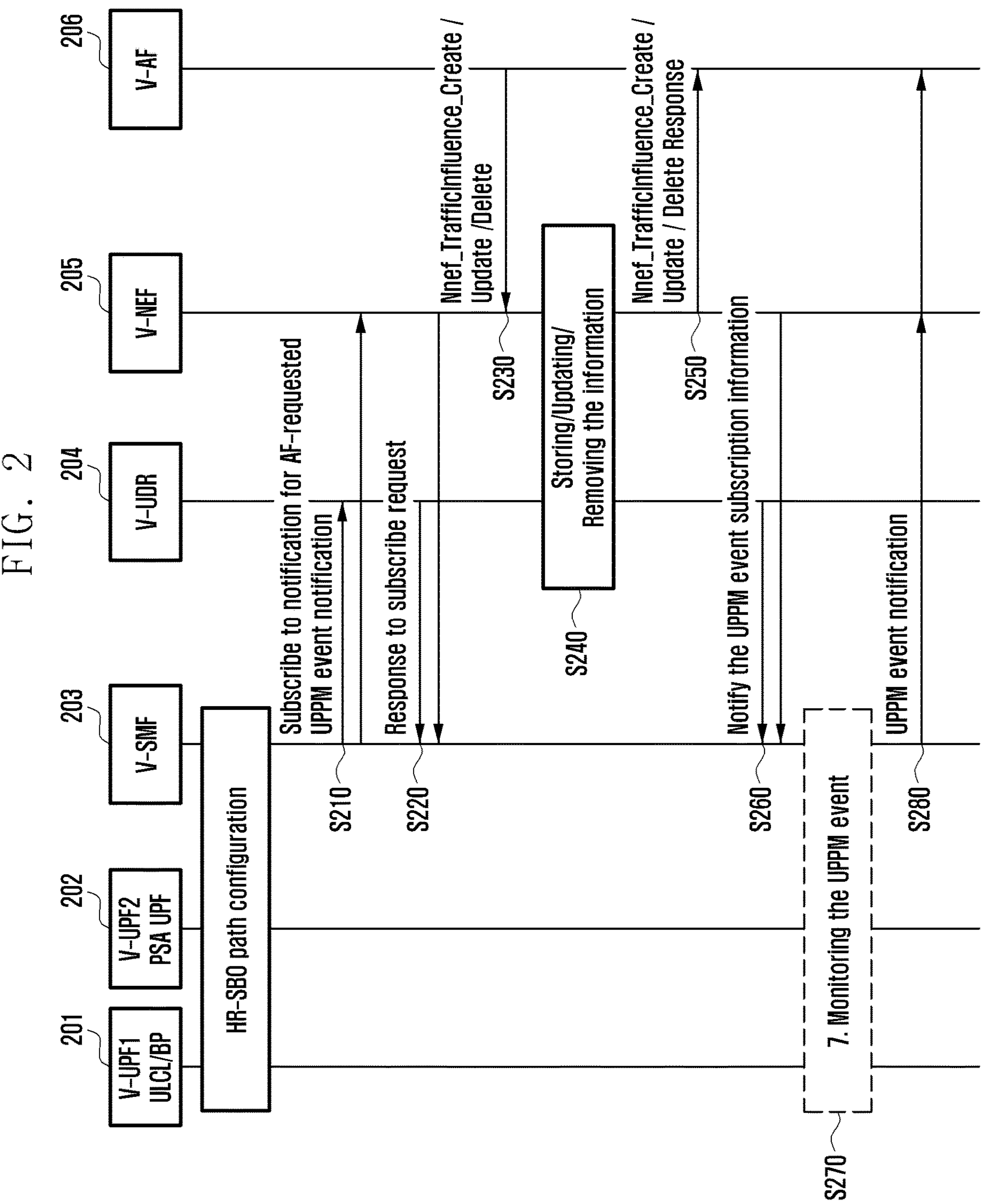
FIG. 2 is a diagram illustrating a method of providing user plane (UP) path management event (UPPM) information of a home-routed (HR) roaming UE according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession is in executed substantially concurrently or the blocks may sometimes be executed in the reverse order, depending upon the functionality involved.

As used in the embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" maybe constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" maybe either combined into a smaller number of elements, or a "unit", or divided into a larger number of elements, or a "unit". Moreover, the elements and "units" or may be implemented to reproduce one or more central processing units (CPUs) within a device or a security multimedia card.

Hereinafter, the disclosure discloses an apparatus and method for providing interworking of network slices (or network slicing) in a wireless communication system. Specifically, the disclosure describes a technology for interworking between a 5G network system structure that provides a network slice function and an EPS network system in a wireless communication system.

In the following description, terms referring to signals, terms referring to channels, terms referring to control information, terms referring to network entities, terms referring to deice elements, and the like are illustratively used for the sake of descriptive convenience. Therefore, the disclosure is not limited by the terms as used below, and other terms referring to subjects having equivalent technical meanings may be used.

Furthermore, in the disclosure, various embodiments will be described using terms used in some communication standards (e.g., the 3rd generation partnership project (3GPP)), but this is only an example for the sake of description. The disclosure may also be easily applied to other communication systems through modifications.

Hereinafter, the operation principle of the disclosure will be described in detail with reference to the accompanying drawings. The terms which will be described below are terms defined in consideration of the functions in the disclosure, and may be different according to users, intentions of the users, or customs. Therefore, the definitions of the terms should be made based on the contents throughout the specification.

As used herein, terms referring to network entities and edge computing system entities, terms referring to messages, terms referring to identification information, and the like are illustratively used for the sake of descriptive convenience. Therefore, the disclosure is not limited by the terms as used below, and other terms referring to subjects having equivalent technical meanings may be used.

In the following description, the disclosure will be described using terms and names defined in the 5G system standards for the sake of descriptive convenience. However, the disclosure is not limited by these terms and names, and may be applied in the same way to systems that conform other standards.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 is a diagram illustrating a 5G system structure supporting home-routed (HR) roaming according to an embodiment of the disclosure.

Referring to FIG. 1, the 5G system structure that supports HR roaming may include various network functions (NF). FIG. 1 illustrates an access and mobility management function (AMF), a session management function (SMF), a policy control function (PCF), an application function (AF), a unified data management (UDM), a data network (DN), a user plane function (UPF), a (radio) access network ((R) AN), and a user equipment (UE) corresponding to some of the NFs.

According to an embodiment of the disclosure, each NF may support the following functions.

The access and mobility management function (AMF) provides functions for UE-based access and mobility management on, and each UE may be basically connected to one AMF. V-AMF refers to the AMF of the visited network based on the UE subscriber. H-AMF refers to the AMF of the home network of the UE subscriber.

The data network (DN) refers to, for example, operator services, Internet access, or 3rd party services. The DN may transmit a downlink protocol data unit (PDU) to the UPF or receive, from the UPF, a PDU transmitted from the UE.

The policy control function (PCF) receives information on the packet flow from the application server and provides a function of determining policies such as mobility management and session management. Specifically, the PCF may support functions such as supporting a unified policy framework to control network operations, providing policy rules so that control plane function(s) (e.g., AMF, SMF, and the like) may enforce policy rules, implementing front-end to access relevant subscription information for policy decisions in user data repository (UDR), and the like.

The session management function (SMF) provides a session management function, and when the UE has multiple sessions, each session may be managed by different SMFs. The V-SMF refers to the AMF of the visited network based on the UE subscriber. The H-SMF refers to the SMF of the home network of the UE subscriber.

The user data management (UDM) may store subscription data, policy data, and the like of the user.

The user plane function (UPF) may deliver the downlink PDU received from the DN to the UE through the (R)AN, and may deliver the uplink PDU received from the UE to the DN through the (R)AN.

The application function (AF) may interact with a 3GPP core network to provide services (for example, supporting functions such as application impact on traffic routing, access network capability exposure, interaction with policy frameworks for policy control, and the like).

The edge data network refers to a data network in which edge computing servers are deployed. The edge data network may be considered as a local part of a data network or a local data network (local part of DN or local DN).

FIG. 2 is a diagram illustrating a method of providing UP path management event (UPPM) information of a home-routed (HR) roaming UE according to an embodiment of the disclosure.

Referring to FIG. 2, a diagram illustrating a visited public land mobile network (VPLMN) internal processing method is illustrated.

First, a visited session management function (V-SMF) 203 may configure a home-routed session breakout (HR-SBO) path.

Specifically, the V-SMF 203 may receive information that the home-routed session breakout (HR-SBO) is possible from the access and mobility management function (AMF) and receive information of notifying that the home-routed session breakout (HR-SBO) is allowed from the home-session management function (H-SMF).

Afterwards, the V-SMF 203 may configure a visited user plane function 1 (V-UPF1) 201 and visited user plane function 2 (V-UPF2) 202 in the visited public land mobile network (VPLMN) through the home-routed session breakout (HR-SBO).

The V-UPF1 201 may include the UPF serving as an uplink classifier (ULCL) or branch point (BP), and the V-UPF2 202 may include the PDU session anchor-UPF (PSA UPF).

In operation S210, the V-SMF 203 may request at least one of an AF-requested user plane path management (UPPM) event notification subscription or a notification subscription for information updates.

Specifically, the V-SMF 203, which is ready to provide edge computing services to HR roaming UEs, may request an AF-requested user plane path management (UPPM) event notification subscription request for the corresponding UE to the visited user data repository (V-UDR) 204 or the visited network exposure function (V-NEF) 205).

Alternatively, the V-SMF 203 may make a notification subscription request for information update such as PDU session-related information, application data information, or AF request information for PDU sessions of a specific data network name (DNN) and single-network slice selection assistance Information (S-NSSAI) with the V-UDR 204.

For example, the specific DNN and S-NSSAI refers to a DNN and S-NSSAI for which HR-SBO is allowed, or may refer to a DNN and S-NSSAI for an HR roaming session.

The request message may include the UE identifier (user equipment identifier, UE ID), UE address, DNN, S-NSSAI, notification target address, application identifier, fully qualified domain name (FQDN), IP address range, DNAI (such as a value that the VPLMN PSA UPF identifies the local part of DN and the access point or a value that may indicate the location of an application placed in the local part of the DN), event ID (AF-requested UPPM event notification), PLMN ID (VPLMN ID or HPLMN ID), and the like.

In addition, the request message may include a plurality of pieces of information or at least one piece of information, and the information included in the request message is not limited thereto.

The V-SMF 203 may make the subscription request in the form of requesting notification of data update within the UDR.

More specifically, the V-SMF 203 may make the subscription request in the form of requesting notification of data updates (e.g., saving or updating new information on application data) within the UDR through the Nudr_DM-_Subscription API.

When the V-SMF 203 transmits a notification subscription request for AF request information or application data update as described above to the V-UDR 204, the V-SMF 203 may distinguish between a case in which the HR-SBO is configured and a case in which the local breakout (LBO) session is configured.

More specifically, to distinguish between the case in which the HR-SBO is configured and the case in which the local breakout (LBO) session is configured, the V-SMF 203 may provide HR-SBO configuration information and DNN and S-NSSAI information, DNAI (e.g., DNAI value corresponding to local part of DN or edge data network where HR sessions that are branched within VPLMN are transmitted, or DNAI value mapped to PSA of UP path of HR sessions, and the like), a serving PLMN ID, an HPLMN ID (a PLMN ID for which a roaming agreement has been completed), a SUPI, and the like to the V-UDR 204.

In operation S220, the V-UDR 204 or the V-NEF 205 may respond to the subscription request.

More specifically, the V-UDR 204 or the V-NEF 205 receiving the subscription request from the V-SMF 203 in the previous operation may transmit a subscription correlation ID, notification correlation ID, subscription success or failure, and the like to the V-SMF 203 and monitor the occurrence of a UPPM event notification subscription request event in the AF.

For example, the V-UDR 204 monitors the occurrence (AF-related information received through V-NEF or UPPM event notification requested by AF) of update of AF request information or application data corresponding to the UE identifier, DNN and S-NSSAI, DNAI, and the like provided by the V-SMF 203.

In operation S230, the visited application function (V-AF) 206 may make a UPPM event notification subscription request for a specific UE or specific DNAI.

Specifically, the V-AF 206 may make a subscription request to the V-NEF 205 using the Nnef_TrafficInfluence service API.

The V-AF 206 may transmit a request message to the V-NEF 205.

The corresponding request message may include the following information.

More specifically, the corresponding request message may include an AF identifier, AF transaction identifier, UE identifier (UE ID), DNN, S-NSSAI, DNAI, serving PLMN ID, home PLMN ID, application identifier, application relocation possibility, information on AF subscription to corresponding SMF events (early or late notification type, AF acknowledgment to be expected, and the like), information on AF change, notification target address, and the like. The request message may include at least one or more of the above information, and is not limited to the information described above.

In operation S240, the V-NEF 205 may store, update, or remove information. More specifically, the V-NEF 205 may store the information received from the V-AF 206 in the V-UDR 204.

The V-NEF 205 may select a DNN and S-NSSAI mapped to the AF identifier received from V-AF 206. The V-NEF 205 may convert the UE identifier received from the V-AF 206 into a subscription permanent identifier (SUPI) or identify the HPLMN ID of the UE through the home PLMN ID provided by the V-AF 206.

The V-NEF 205 may store information provided by the V-AF 206 or information mapped in the V-NEF 205 into the V-UDR 204 as follows.

The V-NEF 205 may configure application data of the V-UDR 204 as data set, and configure traffic influence request information as data subset. The data key for the data may be configured to the AF transaction identifier, S-NSSAI, DNN, and UE identifier (UE group identifier or SUPI), and the HPLMN ID of the UE or information that distinguishes the roaming UE may be configured and stored together.

In addition, the information stored in the V-UDR 204 may be stored separately whether it is information on the HR session or the LBO session. Whether the information stored in the V-UDR 204 is information on the HR session or the LBO session may be distinguished by the PLMN ID, or distinguished through separate roaming type information, DNN, or S-NSSAI and stored.

In operation S250, the V-NEF 205 may inform the V-AF 206 that the request information has been successfully stored.

In operation S260, the V-NEF 205 or V-UDR 204 may transmit at least one of UPPM event subscription information or notification subscription information for information update to the V-SMF 203.

More specifically, the V-NEF 205 or V-UDR 204 may find the V-SMF that has made a notification subscription request for AF request information, AF-requested UPPM event notification, or application data update and transmit related information.

The related information may include UPPM event subscription information or notification subscription information for information updates. The UPPM event subscription information or notification subscription information for the information update may include at least one of an AF identifier, an AF transaction identifier, a UE identifier (UE ID), a DNN, an S-NSSAI, a DNAI, a serving PLMN ID, a home PLMN ID, an application identifier, an application relocation possibility, information on AF subscription to corresponding SMF events (early or late notification type, AF acknowledgment to be expected, and the like), information on AF change, and a notification target address.

The notification subscription information for the information update may include information related to application data information or AF request information. The application data information or information related to the above AF request information may include at least one of an AF identifier, an AF transaction identifier, a UE identifier (UE ID), a DNN, an S-NSSAI, a DNAI, a serving PLMN ID, a home PLMN ID, an application identifier, an application relocation possibility, information on AF subscription to corresponding SMF events (early or late notification type, AF acknowledgment to be expected, and the like), information on AF change, and a notification target address.

In the diagram, for convenience of explanation, operation S260 is illustrated to be performed after operation S250, but the embodiment of the disclosure is not limited to thereto and the order may be changed.

In operation S270, the V-SMF 203 may perform UPPM event monitoring.

More specifically, the V-SMF 203 may perform UPPM monitoring based on at least one of UPPM event subscription information or notification subscription information for information updates received from the V-NEF 205 or V-UDR 204.

The V-SMF 203 may specify a PDU session affected by application data (AF request information; information provided by the V-AF 206 in S230) provided by the V-NEF 205 or the V-UDR 204.

For example, when AF request information requests a UPPM event notification, the PDU session and UPF to be monitored is specified by using information such as UE identifier, DNN/S-NSSAI, DNAI, and the like. More specifically, if the UP path for the UPPM event notification request is a path to the local part of DN where the HR session is branched and transmitted, DNN, S-NSSAI, and DNAI values for the local part of DN may be provided from V-UDR 204, and the V-SMF 203 may monitor an update or relocation event of the V-UPF (V-UPF2, 202, which performs the role of PSA UPF for the local part of the DN) corresponding to the information.

In operation S280, the V-SMF 203 may transmit a notification of an event occurring in the UP path of the branched session of the HR roaming UE to the V-AF 206 through the V-NEF 205.

For example, the event includes UPF change/relocation or DNAI change of the V-UPF1 201 performing the ULCL/BP role or V-UPF2 202 performing the local PSA role where the branched session is transmitted to the local part of DN.

Alternatively, the V-SMF 203 may directly transmit to the V-AF 206 by using the notification target address received in operation S260 without going through the V-NEF 205.

Referring to FIG. 2, the V-SMF 203 may simultaneously manage a session for an HR roaming UE and a general PDU session of a subscriber UE of a VPLMN.

In this case, the V-SMF 203 may directly receive notification related information on a session-related event for the HR roaming UE from the V-UDR 204 or the V-NEF 205.

In addition, the V-SMF 203 may specify a PDU session through the UE identifier, DNN/S-NSSAI information, or the like, and distinguish whether the corresponding UE is an HR roaming UE or a subscriber UE of the VPLMN.

If the HR-SBO is performed for a specific PDU session, a subscription request may be performed directly to the V-UDR 204 or V-NEF 205 as in operation S210 to receive notification of generation/update of information (application data, policy data) related to the session stored in the V-UDR 204.

Figure 3:
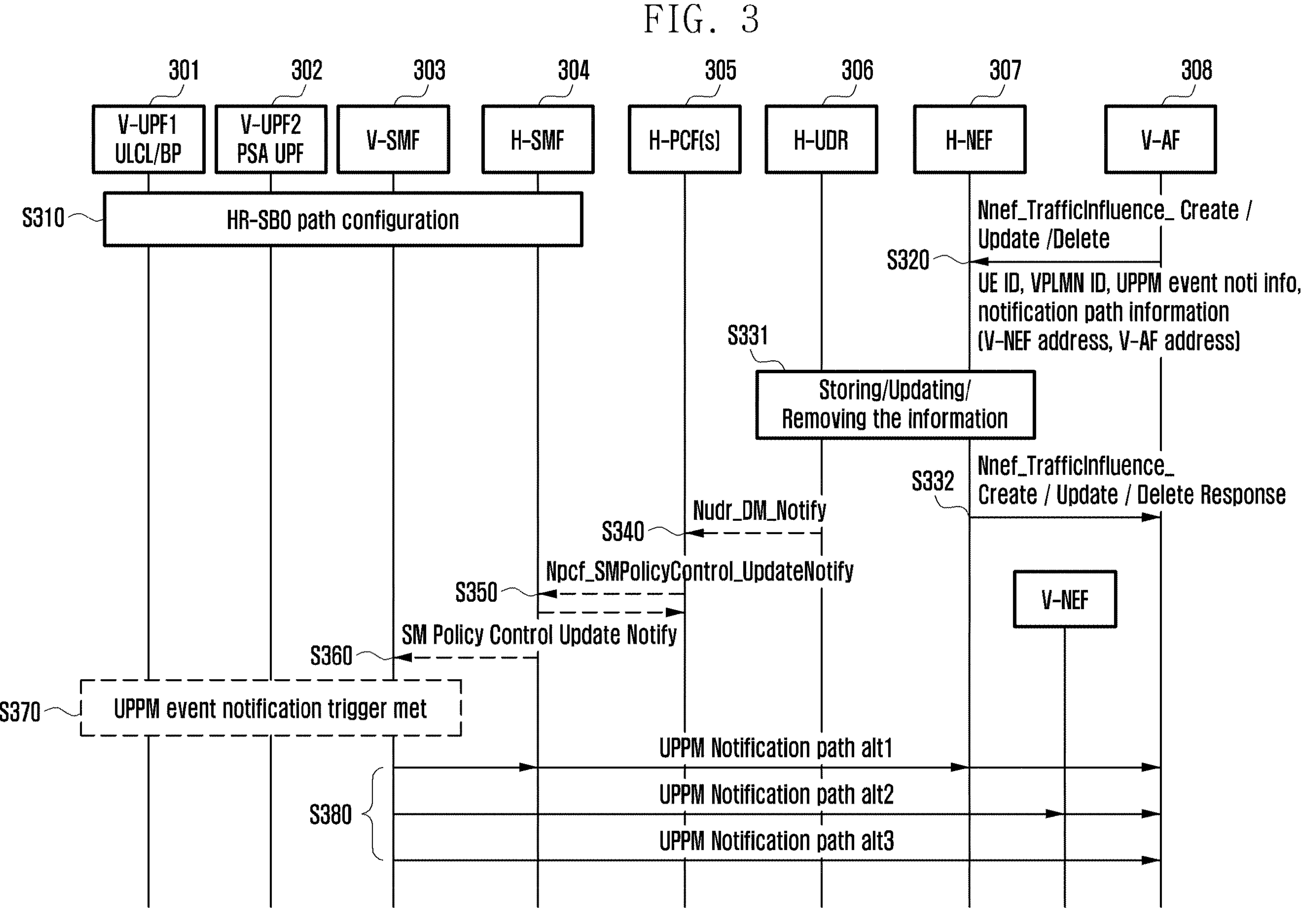
FIG. 3 is a diagram illustrating a method of providing UP path management event (UPPM) information of a home-routed (HR) roaming UE according to an embodiment of the disclosure.

FIG. 3 is a diagram illustrating a method of providing UP path management event (UPPM) information of a home-routed (HR) roaming UE according to an embodiment of the disclosure.

More specifically, FIG. 3 is a diagram illustrating a processing method through a home public land mobile network (HPLMN).

Referring to FIG. 3, in operation S310, the visited session management function (V-SMF) 303 may receive information from the AMF that the HR-SBO is possible and may receive information from the home-routed session breakout (H-SMF) 304 indicating that the home-routed session breakout (HR-SBO) is allowed. The V-SMF 303 receiving the above information may configure the V-UPF1 (visited user plane function) 301 and the V-UPF2 302 in the VPLMN through the home-routed session breakout (HR-SBO). The V-UPF1 301 may include an UPF serving as an uplink classifier (UCUL) or branch point, and the V-UPF2 302 may include a PDU session anchor (PSA) UPF.

In operation S320, the V-AF 308 may transmit a subscription request for UPPM event notification to the home network exposure function (H-NEF) 307.

Specifically, the V-AF 308 may transmit a request message related to the subscription request to the H-NEF 307. The corresponding message may include an AF identifier, an AF transaction identifier, a user equipment identifier (UE ID), a DNN, an S-NSSAI, a DNAI, a serving PLMN ID, a home PLMN ID, an application identifier, an application relocation possibility, information on AF subscription to corresponding SMF events (UPPM event, early or late notification type, AF acknowledgment to be expected, and the like), information on AF change, a V-NEF address, an AF address, and the like. The request message may include at least one piece of the above information, and the information included in the request message is not limited to the information described above.

In operation S320, when the V-AF 308 cannot transmit the request message directly to the H-NEF 307, the V-AF 308 may transmit the subscription request message for the UPPM event notification to the V-NEF.

The subscription request message for the UPPM event notification transmitted by the V-AF 308 to the V-NEF may include at least one of a UE ID, a serving PLMN ID, a home PLMN ID and/or a DNAI, DNN, an S-NSSAI, an AF identifier, and a DNAI.

Afterwards, the V-NEF may transmit the subscription request for the H-NEF 307 UPPM event notification. For example, the V-NEF transmits the subscription request for the corresponding UPPM event notification to the H-NEF 307 by considering the UE ID, serving PLMN ID, home PLMN ID and/or DNAI included in the information received from the V-AF 308.

In this case, the V-NEF may convert (mapping or translation) the DNN, S-NSSAI, AF identifier, DNAI, and the like. among the information received from the V-AF 308 into the HPLMN DNN, S-NSSAI, and DNAI values that may be used in the HPLMN, and transmit the subscription request for UPPM event notification including converted information to the H-NEF 307.

The H-NEF receiving the subscription request for UPPM event notification may perform the following operations. More specifically, when the H-NEF 307 receives the subscription request for UPPM event notification from the V-AF 308, the H-NEF 307 may map the AF identifier provided by the V-AF 308 to the DNN and S-NSSAI of the HPLMN. The H-NEF 307 may map the DNN and S-NSSAI or DNAI values provided by the V-AF 308 to the DNN and S-NSSAI or DNAI values used in the HPLMN. If the H-NEF 307 receives the subscription request for UPPM event notification from the V-NEF, H-NEF 307 may map the AF identifier, DNN, S-NSSAI, and DNAI values received through the V-NEF to the DNN, S-NSSAI, or DNAI values available in the HPLMN.

In operation S331, the H-NEF 307 may store the information provided by the V-AF 308 and the information mapped by the H-NEF 307. For example, H-NEF 307 associates the information (an AF identifier, an AF transaction identifier, a user equipment identifier (UE ID), a DNN, an S-NSSAI, a DNAI, a serving PLMN ID, a home PLMN ID, an application identifier, an application relocation possibility, information on AF subscription to corresponding SMF events (UPPM event, early or late notification type, AF acknowledgment to be expected, and the like.), information on AF change, a V-NEF address, an AF address, and the like) provided by the V-AF 308 with the information (DNN and S-NSSAI or DNAI values available on HPLMN) mapped by the H-NEF 307 and store the associated information in the H-UDR 306.

In addition, in operation S332, the H-NEF 307 may transmit a response message to the V-AF 308 indicating whether the AF request has been successfully processed.

In operation S340, the H-UDR 306 may transmit the information stored in the H-UDR 306 by the H-NEF 307 to the H-PCF 305, which has previously made a subscription request for application data or AF request information. The information may include information (an AF identifier, an AF transaction identifier, a user equipment identifier, a DNN, an S-NSSAI, a DNAI, a serving PLMN ID, a home PLMN ID, an application identifier, an FQDN, an application relocation possibility, information on AF subscription to corresponding SMF events (UPPM event, early or late notification type, AF acknowledgment to be expected, and the like), information on AF change, a V-NEF address, and an AF address) stored by the H-NEF 307 in the above procedure.

The H-PCF 305 may in advance make a subscription request to the H-UDR 306 for update notification for application data or AF request information for a specific UE or specific DNN and S-NSSAI, and the H-UDR 306 may specify the H-PCF 305 based on the corresponding subscription request information.

In operation S350, the H-PCF 305 may transmit a notification subscription request for an event specified through application data or AF request information to the H-SMF 304, which manages the PDU session mapped to the information received from the H-UDR 306.

For example, the H-PCF 305 transmits subscription request information (at least one of an AF identifier, an AF transaction identifier, a user equipment identifier, a DNN, an S-NSSAI, a DNAI, a serving PLMN ID, a home PLMN ID, an application identifier, an FQDN, an application relocation possibility, information on AF subscription to corresponding SMF events (early or late notification type, AF acknowledgment to be expected, and the like), information on AF change, a V-NEF address as notification target address information, and an AF address) for the UPPM event notification. In addition, the H-PCF 305 may distinguish and provide whether the UPPM event notification subscription is for the UPF of HPLMN or the UPF in VPLMN based on at least one of the DNN, S-NSSAI, DNAI value, or PLMN ID value, and V-NEF address information.

In operation S360, the H-SMF 304 may determine whether the information received from the H-PCF 305 should be transmitted to the V-SMF 303 or whether monitoring of the H-UPF should be performed.

For example, when a VPLMN ID is provided along with the information provided by the H-PCF 305, the H-SMF 304 determines that the information should be applied in the VPLMN and transmit it to the V-SMF 303. Alternatively, the H-SMF 304 may determine whether the information should be transmitted to the V-SMF or applied to the H-UPF by checking the DNAI value included in the information provided by the H-PCF 305. For example, the H-SMF 304 determines whether the DNAI value is a value corresponding to the H-UPF or information mapped to one of the V-UPFs connected to the V-SMF. Alternatively, the H-SMF 304 may determine whether the corresponding DNAI value is information mapped to the local part of DN of the VPLMN.

In operation S370, the V-SMF 303 may monitor an UPPM event according to information provided by the H-SMF 304. For example, the V-SMF 303 performs monitoring by selecting the V-UPF mapped to the DNAI value provided by the H-PCF 305. Alternatively, the V-SMF 303 may monitor only the occurrence of a UPPM event related to the V-UPF (e.g., V-UPF2) that serves as a PSA for a local part of the DN in consideration of the AF identifier or the application identifier or the FQDN information and the DNAI.

In operation S380, when a UPPM event occurs, the V-SMF 303 may select a UPPM notification transmission path and perform transmission in consideration of the notification target address, the AF address, and the V-NEF address received from the H-SMF 304.

For example, when the V-NEF address is received from the H-SMF (when the V-AF provides the V-NEF to the H-NEF), the V-SMF 303 may transmit UPPM notification to the V-NEF and transmit the UPPM notification to the V-AF. Alternatively, when the V-NEF address is not included and only the V-AF address is included, the V-SMF may transmit UPPM event notification directly to the V-AF. Alternatively, the V-SMF may transmit UPPM event notification to the H-SMF and the H-SMF may transmit UPPM event notification to the V-AF through the H-NEF.

Figure 4:
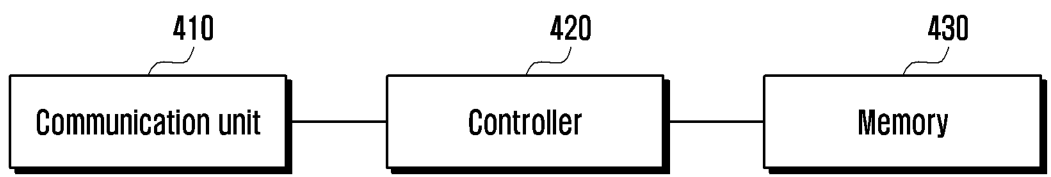
FIG. 4 is a diagram illustrating a structure of a network entity performing an operation according to an embodiment of the disclosure.

FIG. 4 is a diagram illustrating the structure of a network entity performing an operation according to an embodiment of the disclosure.

Referring to FIG. 4, the network entity according to the disclosure may include a communication unit 410, a controller 420, and a memory 430.

The communication unit 410 may be connected to the controller 420 and may transmit and receive signals to and from external entities. Here, the signal may include control information and data.

The controller 420 may include one or more processors or processing devices that control the proposed function, process or method. In addition, the controller 420 may control performing an operation according to an embodiment of the disclosure by using one or more processes.

The memory 430 may store data or control information included in the obtained signal. In addition, the memory 430 may be connected to the controller 420 to store at least one instruction, protocol, or parameter for performing the proposed function, process, or method. The memory 430 may include a read-only memory (ROM), a random access memory (RAM), a hard disk, a compact disc read only memory (CD-ROM), a digital versatile disc (DVD), or other storage devices.

Figure 5:
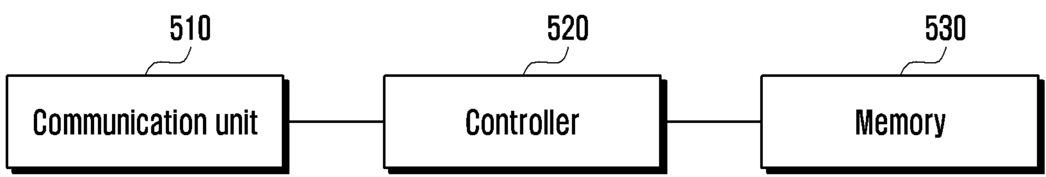
FIG. 5 is a diagram illustrating a structure of a UE according to an embodiment of the disclosure.

FIG. 5 is a diagram illustrating the structure of a UE according to an embodiment of the disclosure.

Referring to FIG. 5, the UE according to the disclosure may include a communication unit 510, a controller 520, and a memory 530.

The communication unit 510 may be connected to the controller 520 and may transmit and receive signals to and from external entities. Here, the signal may include control information and data. For example, the communication unit 510 may be connected to the controller 520, receive a signal through a radio channel, and transmit the signal output from the controller 520 through the radio channel. The communication unit 510 may include a radio frequency (RF) transmitter that up-converts and amplifies the transmitted signal and an RF receiver that down-converts the frequency of the received signal.

The controller 520 may include one or more processors or processing devices that control the proposed function, process or method. In addition, the controller 520 may control performing an operation according to an embodiment of the disclosure by using one or more processes. The memory 530 may store data or control information included in the obtained signal. In addition, the memory 530 may be connected to the controller 520 to store at least one instruction, protocol, or parameter for performing the proposed function, process, or method. The memory 530 may include a read-only memory (ROM), a random access memory (RAM), a hard disk, a CD-ROM, a DVD, or other storage devices.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a visited session management function (V-SMF) entity in a communication system, the method comprising:

generating a request message to subscribe to a notification of traffic influence from an application function (AF) entity;

transmitting, to a visited-network exposure function (V-NEF) entity, the request message;

receiving, from the V-NEF entity, a response message including a correlation identifier (ID) of a subscription to the notification of the traffic influence from the AF entity, the correlation ID being received as a response to the subscription being accepted;

receiving, from the V-NEF entity, the notification of the traffic influence from the AF entity, wherein the traffic influence from the AF entity is for subscribing to a user plane (UP) path change event of a home routed session breakout (HR-SBO); and performing UP path change event monitoring for the HR-SBO.

2. The method of claim 1, further comprising:
transmitting, to the AF entity via the V-NEF entity, a notification message for the UP path change event, based on an identification of the UP path change event.

3. The method of claim 1,
wherein the request message includes at least one of a single network slice selection assistance information (S-NSSAI) or a data network name (DNN), and a home public land mobile network (HPLMN) ID.

4. The method of claim 3,
wherein information on the traffic influence from the AF entity is stored in a visited-user data repository (V-UDR) entity as application data,
wherein a data subset of the application data is configured with AF traffic influence request information, and
wherein a data key of the application data includes an AF transaction internal ID, the S-NSSAI, the DNN, and the HPLMN ID.

5. The method of claim 1,
wherein the V-SMF entity supports the HR-SBO, and
wherein the AF entity is located in a visited public land mobile network (VPLMN).

6. The method of claim 1,
wherein the V-SMF entity is associated with a user plane function (UPF) entity using at least one of an uplink classifier (CL) or a branching point (BP).

7. A method performed by a visited network exposure function (V-NEF) entity in a communication system, the method comprising:
receiving, from a visited-session management function (V-SMF) entity, a request message to subscribe to a notification of traffic influence from an application function (AF) entity;
transmitting, to the V-SMF entity, a response message including a correlation identifier (ID) of a subscription to the notification of the traffic influence from the AF entity, the correlation ID being transmitted as a response to the subscription being accepted by the V-NEF;
receiving, from the AF entity, information on the traffic influence from the AF entity, wherein the traffic influence from the AF entity is for subscribing to a user plane (UP) path change event of a home routed session breakout (HR-SBO);
identifying that the V-SMF entity is subscribed to the information on the traffic influence from the AF entity;
generating the notification of the traffic influence from the AF entity; and
transmitting, to the V-SMF entity, the notification of the traffic influence from the AF entity.

8. The method of claim 7, further comprising:
receiving, from the V-SMF entity, a notification message for the UP path change event, based on the UP path change event; and
transmitting, to the AF entity, the notification message.

9. The method of claim 7,
wherein the request message includes at least one of a single network slice selection assistance information (S-NSSAI) or a data network name (DNN), and a home public land mobile network (HPLMN) ID.

10. The method of claim 9,
wherein the information on the traffic influence from the AF entity is stored in a visited-user data repository (V-UDR) entity as application data,
wherein a data subset of the application data is configured with AF traffic influence request information, and
wherein a data key of the application data includes an AF transaction internal ID, the S-NSSAI, the DNN, and the HPLMN ID.

11. The method of claim 7,
wherein the V-SMF entity supports the HR-SBO, and
wherein the AF entity is located in a visited public land mobile network (VPLMN).

12. The method of claim 7,
wherein the V-SMF entity is associated with a user plane function (UPF) entity using at least one of an uplink classifier (CL) or a branching point (BP).

13. A visited session management function (V-SMF) entity in a communication system, the V-SMF entity comprising:
a transceiver; and
a controller configured to:
generate a request message to subscribe to a notification of traffic influence from an application function (AF) entity,
transmit, to a visited-network exposure function (V-NEF) entity, the request message,
receive, from the V-NEF entity, a response message including a correlation identifier (ID) of a subscription to the notification of the traffic influence from the AF entity, the correlation ID being received as a response to the subscription being accepted,
receive, from the V-NEF entity, the notification of the traffic influence from the AF entity, wherein the traffic influence from the AF entity is for subscribing to a user plane (UP) path change event of a home routed session breakout (HR-SBO), and
perform UP path change event monitoring for the HR-SBO.

14. The V-SMF entity of claim 13, wherein the controller is further configured to:
transmit, to the AF entity via the V-NEF entity, a notification message for the UP path change event, based on an identification of the UP path change event.

15. The V-SMF entity of claim 13,
wherein the request message includes at least one of a single network slice selection assistance information (S-NSSAI) or a data network name (DNN), and a home public land mobile network (HPLMN) ID,
wherein information on the traffic influence from the AF entity is stored in a visited-user data repository (V-UDR) entity as application data,
wherein a data subset of the application data is configured with AF traffic influence request information, and
wherein a data key of the application data includes an AF transaction internal ID, the S-NSSAI, the DNN, and the HPLMN ID.

16. The V-SMF entity of claim 13,
wherein the V-SMF entity supports the HR-SBO,
wherein the AF entity is located in a visited public land mobile network (VPLMN), and
wherein the V-SMF entity is associated with a user plane function (UPF) entity using at least one of an uplink classifier (CL) or a branching point (BP).

17. A visited network exposure function (V-NEF) entity in a communication system, the V-NEF entity comprising:
a transceiver; and
a controller configured to:
receive, from a visited-session management function (V-SMF) entity, a request message to subscribe to a notification of traffic influence from an application function (AF) entity, transmit, to the V-SMF entity, a response message including a correlation identifier (ID) of a subscription to the notification of the traffic influence from the AF entity, the correlation ID being transmitted as a response to the subscription being accepted by the V-NEF, receive, from the AF entity, information on the traffic influence from the AF entity, wherein the traffic influence from the AF entity is for subscribing to a user plane (UP) path change event of a home routed session breakout (HR-SBO), identify that the V-SMF entity is subscribed to the information on the traffic influence from the AF entity, generate the notification of the traffic influence from the AF entity, and transmit, to the V-SMF entity, the notification of the traffic influence from the AF entity.

18. The V-NEF entity of claim 17, wherein the controller is further configured to:

receive, from the V-SMF entity, a notification message for the UP path change event, based on the UP path change event, and transmit, to the AF entity, the notification message.

19. The V-NEF entity of claim 17, wherein the request message includes at least one of a single network slice selection assistance information (S-NSSAI) or a data network name (DNN), and a home public land mobile network (HPLMN) ID, wherein the information on the traffic influence from the AF entity is stored in a visited-user data repository (V-UDR) entity as application data, wherein a data subset of the application data is configured with AF traffic influence request information, and wherein a data key of the application data includes an AF transaction internal ID, the S-NSSAI, the DNN, and the HPLMN ID.

20. The V-NEF entity of claim 17, wherein the V-SMF entity supports the HR-SBO, wherein the AF entity is located in a visited public land mobile network (VPLMN), and wherein the V-SMF entity is associated with a user plane function (UPF) entity using at least one of an uplink classifier (CL) or a branching point (BP).

* * * * *